CAMERA WITH REMOTE CONTROL AND BATTERY RECHARGER

Filed April 28, 1966

INVENTOR.
LEW W. LESSLER
BY James and Franklin
ATTORNEY

INVENTOR.
LEW W. LESSLER
BY
James and Franklin
ATTORNEY

United States Patent Office 3,450,471

Patented June 17, 1969

3,450,471
CAMERA WITH REMOTE CONTROL AND BATTERY RECHARGER

Lew W. Lessler, Elmhurst, N.Y., assignor to De Jur-Amsco Corporation, Long Island City, N.Y., a corporation of New York Filed Apr. 28, 1966, Ser. No. 545,927
Int. Cl. G03b *1/00*
U.S. Cl. 352—166 4 Claims

ABSTRACT OF THE DISCLOSURE

A battery driven motion picture camera system comprises a camera having a motor and a local control switch, a remote control switch, and a battery recharger. The camera has a single electrical socket which receives either of two plugs. The remote control switch has a relatively long flexible cord terminating in one plug, and the battery recharging unit has a flexible cord terminating in a different plug. When the plug of the remote control switch is used, the remote control switch is operative. When the plug of the recharger is used, the local switch operates the camera while recharging, and without removing the battery from the camera.

This invention relates to battery-driven motion picture cameras, and more particularly to those having rechargeable batteries.

Battery-driven cameras have a local control switch, frequently of the trigger type, and usually provided with locking means such that the trigger may be locked in "off" position or "on" position. It has been suggested to provide a remote control switch with a relatively long flexible cord terminating in a plug, the camera being provided with a socket to receive the plug, and the wiring being such that the camera may be controlled by the remote control switch. It has been proposed to drive the camera by means of rechargeable battery cells, the camera being provided with a battery recharger unit having a flexible cord terminating in a plug for insertion in a socket on the camera. It has also been suggested to employ the same socket for both purposes, but in such case it has not been feasible to operate the camera by means of the local switch while using the battery recharging unit, as when the camera is needed and the batteries are weak. In some cases the recharging unit can be used for drive purposes, but only after taking the precaution of first removing the battery cells from the camera. If this is not done the equipment may be injured, or the camera may run at excessive speed.

The general object of the present invention is to overcome the foregoing difficulty, and to make it possible to use a camera of the aforesaid type while connected to the recharging unit, and with the battery cells remaining in place.

To accomplish the foregoing general object, and other more specific objects which will hereinafter appear, my invention resides in the battery-driven motion picture camera system, and the elements thereof, and their relation one to another, as are hereinafter more particularly described in the following specification. The specification is accompanied by drawings in which.

Figure 1:
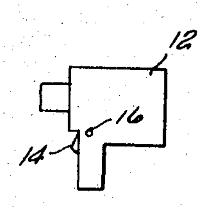
FIG. 1 shows a battery-driven motion picture camera having a lockable trigger switch.

Referring to the drawing, and more particularly to FIG. 1, the motion picture camera 12 is of the battery-driven type, its electric motor being controlled by means of a suitable local control switch, which frequently is of the trigger type shown at 14. The trigger may be locked, as by means of a trigger lock schematically represented at 16.

Figure 2:
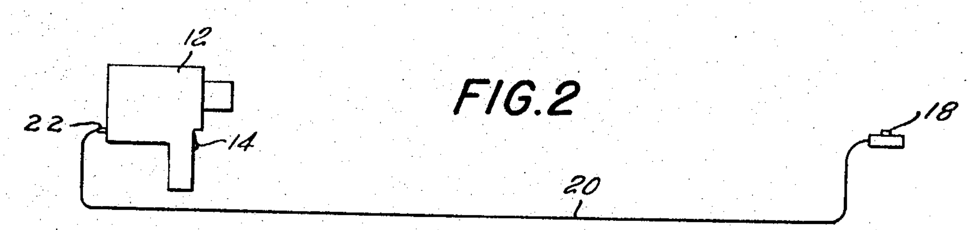
FIG. 2 is a schematic view showing the camera operated by means of a remote control switch.

Referring now to FIG. 2, the camera 12 is being used under remote control, for example for self-photography, or animal or bird photography. The trigger 14 is locked in closed position, and the motor then is controlled by means of a remote control switch 18, this having a long flexible two-wire cord 20 terminating in a plug 22 which is plugged into a socket mounted on the camera body.

Figure 3:
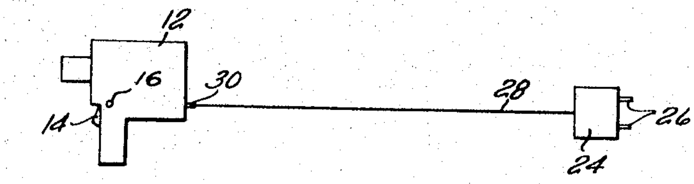
FIG. 3 is a schematic view showing the camera being recharged.

Referring now to FIG. 3, the camera 12 is being recharged by means of a battery-recharging unit or power pack 24. In usual practice the unit has a pair of plug-in prongs 26 which may be pushed into an ordinary 115 volt wall socket or outlet. The unit contains suitable means for rectification and for voltage step-down, and the resulting low voltage DC output is supplied to a two-wire cable 28 terminating in a plug 30 which is plugged into the same camera socket as was previously used for the plug 22. The battery cells then are recharged, and the camera may be used during recharging operation under control of the local control switch 14. Other recharging units may be designed for a 220 volt supply, or for an automobile DC supply.

Figure 7:
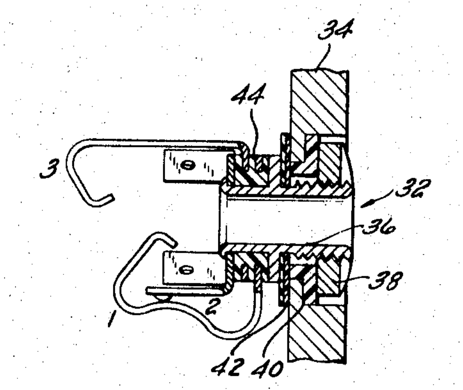
FIG. 7 is a section through a three-terminal socket forming a part of the camera, with no plug therein.

Referring now to FIG. 7, the socket generally designated 32 is a three-terminal socket, mounted in conventional fashion on a wall 34 of the camera body. The socket comprises a metal bushing 36 secured in position by means of a retainer nut 38. If the camera body is made of metal the bushing may be insulated, as by means of insulating bushing and washer 40 and 42. The socket has a short resilient contact marked 1, and a long resilient contact marked 3, these extending generally in the direction of the axis of the bushing 36. They are insulatedly mounted on the bushing, the insulation material being indicated at 44. The bushing also carries and is effectively extended inward by means of a short stiff contact marked 2, and this is engaged by resilient contact 1 when there is no plug in the socket, as shown in FIG. 7.

This three-terminal socket may be a conventional socket which is commercially available, but which ordinarily is used with a three-terminal plug having a tip which engages contact 3; a band which engages contact 1, and a shank which engages the bushing. In the present system the socket is employed with two different two-terminal plugs, one plug being short to engage contact 1 without reaching contact 3, and the other being long enough to engage contact 3.

Figure 8:
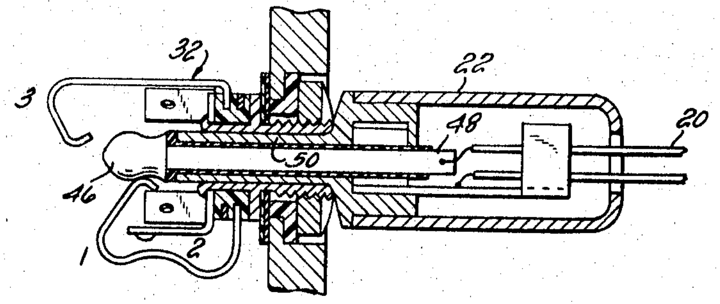
FIG. 8 is a similar view but with a short plug inserted therein.

Referring now to FIG. 8, the short plug 22 is used with the remote control switch. The plug is of the conventional concentric type, it having a tip 46 carried by a center rod 48 which passes insulatedly through the metal shank or sleeve 50 of the plug. The tip 46 engages the short contact 1, and moves it outward so that it is disconnected from the contact 2. The long contact 3 at this time is idle.

Figure 9:
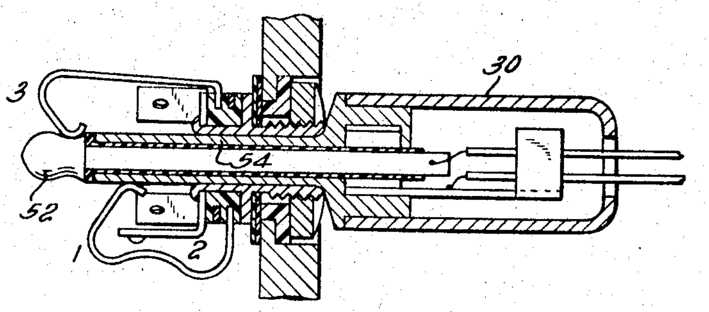
FIG. 9 is a similar view but with a long plug inserted therein.

Referring now to FIG. 9, the long plug 30 is used for the recharging unit. It too is of the conventional concentric type, but is longer than the plug 22. Its tip 52 engages the contact 3. The metal shank 54 engages contact 1, but it also engages the bushing, thus electrically connecting together terminals 1 and 2 even though they remain physically spaced as shown in FIG. 9.

Figure 10:
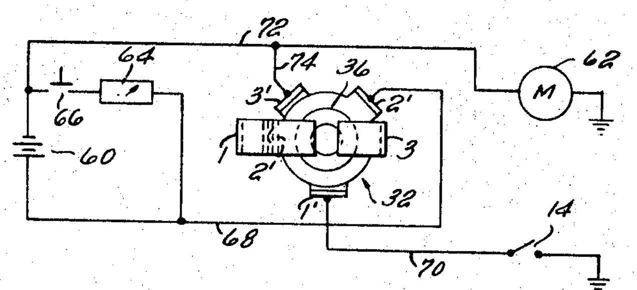
FIG. 10 is an electrical diagram for the camera and includes an end view of the three-terminal socket.

Referring now to FIG. 10, the rechargeable battery cells in the camera are indicated at 60; the motor is shown at 62; and the local control switch is shown at 14. If desired, the battery may be shunted by means of a battery test meter 64 in series with a battery test switch 66. The three-terminal socket of the present invention is indicated at 32, this being an end view with the short contact shown at 1; the long contact shown at 3; and the bushing shown at 36.

The soldering lug or terminal for contact 1 is shown at 1'; the soldering lug or terminal for contact 3 is shown at 3'; and the soldering lug or terminal for the bushing 36 and its extension 2 is shown at 2'. The said extension 2 of the bushing is indicated in broken lines, and is electrically connected to the soldering lug 2' through the bushing 36. In the diagram it will be seen that one side of the battery 60 is connected by wire 68 to lug 2'; the local control switch 14 is connected by wire 70 to lug 1'; and the other side of battery 60 and wire 72 which leads to the motor 62 are connected by a wire 74 to the lug 3'.

Figure 4:
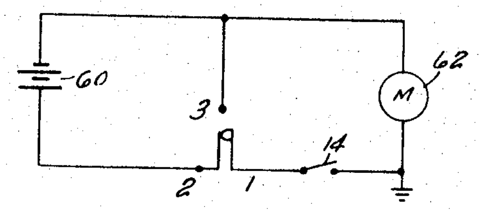
FIG. 4 is an electrical diagram showing the camera operated by its local control switch.

The operation may be explained with reference to FIGS. 4, 5 and 6 of the drawing. In FIG. 4 there is no plug in the socket, and short contact 1 moves inward against fixed contact or bushing extension 2, thus closing the circuit from battery 60 to the local control switch 14. Switch 14 then controls the motor 62, and contact 3 is idle.

Figure 5:
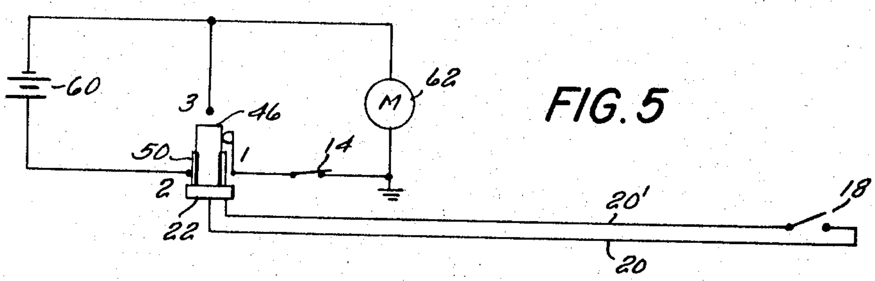
FIG. 5 is an electrical diagram showing the camera operated by a remote control switch.

Referring now to FIG. 5, the short plug 22 has been inserted in the socket. This disconnects contact 1 from contact 2, while contact 3 remains idle. The remote control switch 18 has one wire 20 leading to the tip 46 of the plug 22, and so to contact 1 and to the motor, the local switch 14 being locked in closed position at this time. The other conductor 20' leads from switch 18 to the shank 50 of the plug, and so to the socket terminal 2 and to the battery 60. It will be evident that switches 14 and 18 are in series, and that switch 18 controls the motor so long as switch 14 remains locked in closed position as shown.

Figure 6:
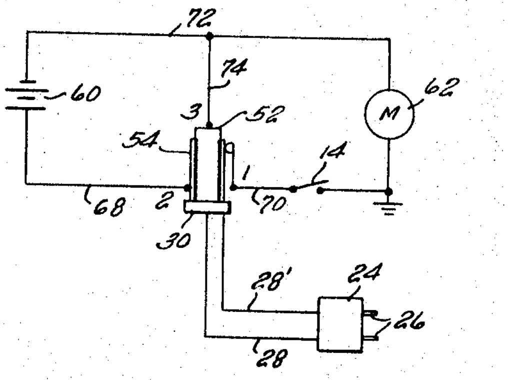
FIG. 6 is an electrical diagram showing the camera being used under control of its local control switch while being recharged.

Referring now to FIG. 6, the long plug 30 has been inserted in the socket. The battery recharging unit 24 is assumed to have its prongs 26 plugged into a wall outlet or other power supply source. One conductor 28 leads to the tip 52 of the plug, and so is connected to contact 3, and thence to the conductor 72 through conductor 74. The other wire 28' is connected to the shank 54 of the plug, and so is connected to contact 1 leading to local control switch 14, and also to terminal 2 leading to the battery 60.

On reflection it will be seen that the charging unit 24 is connected in shunt with the battery 60 and with the motor 62, it being connected between the conductor 72 at the top and the conductors 68 and 70 at the bottom of the diagram. With this arrangement the charging unit 24 may be used to operate the motor 62 without having to remove the battery cells 60. The motor is controlled as usual by the local control switch 14. The charging operation proceeds without any attention on the part of the user.

Thus, if it be desired to use the camera, and the battery is found to have run down, the camera may be operated by means of the recharging unit. The same socket is also used at other times for remote control.

It is believed that the construction and operation of my improved battery-driven motion picture camera system, as well as the advantages thereof, will be apparent from the foregoing detailed description. It will also be apparent that while I have shown and described the system in a preferred form, changes may be made without departing from the scope of the invention as sought to be defined in the following claims.

I claim:

1. A battery-driven motion picture camera system comprising a camera and a remote control switch and a battery recharger, said camera having a motor and a local control switch connected in series between the battery and the motor, and having a three-terminal electrical socket with a bushing and first and second contacts, a remote control switch with a relatively long flexible two-wire cord terminating in a plug shaped and dimensioned for insertion in the socket and to engage the said bushing and first contact but not the second contact, and a battery recharging unit having a flexible two-wire cord terminating in a plug shaped and dimensioned for insertion in the socket and to engage the bushing and the second contact, the three terminals of the socket being connected to the battery and the local control switch and the motor of the camera by circuitry such that when the plug of the remote control switch is plugged into the socket the remote control switch controls the motor, and when the plug of the battery recharging unit is plugged into the socket the charging unit is in shunt with the battery and the motor, so that the local control switch may be used to operate the camera while the recharging unit is operative and without first removing the battery from the camera.

2. A battery-driven motion picture camera system as defined in claim 1, in which the socket has a bushing and a short contact and a long contact extending generally in the direction of the axis of the socket, and in which the short contact engages the bushing electrically when no plug is inserted in the socket, and in which the plug of the remote control switch is a short plug of concentric type the tip of which is dimensioned to engage the short contact of the socket, and to open the connection between the short contact and the bushing, without reaching the long contact, and in which the plug of the battery recharging unit is a long plug of concentric type the tip of which is dimensioned to engage the long contact of the socket while the shank of the plug engages the short contact of the socket, the said short contact being permanently connected to the local control switch, the bushing being connected to one side of the battery, and the long contact being connected to the other side of the battery.

3. A battery-driven motion picture camera system as defined in claim 1 in which there is means to lock the local control switch in closed position, and in which the remote control switch when plugged into the socket is in series with the local control switch for remote control of the motor while the local control switch is locked in closed position.

4. A battery-driven motion picture camera system as defined in claim 3, in which the socket has a bushing and a short contact and a long contact extending generally in the direction of the axis of the socket, and in which the short contact engages the bushing electrically when no plug is inserted in the socket, and in which the plug of the remote control switch is a short plug of concentric type the tip of which is dimensioned to engage the short contact of the socket, and to open the connection between the short contact and the bushing, without reaching the long contact, and in which the plug of the battery recharging unit is a long plug of concentric type the tip of which is dimensioned to engage the long contact of the socket while the shank of the plug engages the short contact of the socket, the said short contact being permanently connected to the local control switch, the bushing being connected to one side of the battery, and the long contact being connected to the other side of the battery.

References Cited

UNITED STATES PATENTS

| | | | |
|---|---|---|---|
| 860,360 | 7/1907 | Eldredge. | |
| 3,011,035 | 11/1961 | Gloviak | 200—51.09 |
| 3,187,341 | 6/1965 | Kubota. | |
| 3,234,848 | 2/1966 | Stoothoff. | |
| 3,289,149 | 11/1966 | Pawloski | 339—183 |

NORTON ANSHER, *Primary Examiner.*
MONROE H. HAYES, *Assistant Examiner.*

U.S. Cl. X.R.

200—51.1; 240—10.6; 339—183; 352—179